(12) United States Patent
Creech

(10) Patent No.: US 11,625,391 B2
(45) Date of Patent: *Apr. 11, 2023

(54) TRANSACTION PROCESSING FAILOVER

(71) Applicant: Capital One Services, LLC, McLean, VA (US)

(72) Inventor: Jacob Creech, McKinney, TX (US)

(73) Assignee: Capital One Services, LLC, McLean, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/851,873

(22) Filed: Jun. 28, 2022

(65) Prior Publication Data

US 2022/0327115 A1 Oct. 13, 2022

Related U.S. Application Data

(63) Continuation of application No. 16/549,262, filed on Aug. 23, 2019, now Pat. No. 11,386,080.

(51) Int. Cl.
*G06F 16/23* (2019.01)
(52) U.S. Cl.
CPC ...... *G06F 16/2379* (2019.01); *G06F 16/2365* (2019.01)
(58) Field of Classification Search
CPC .. G06F 16/23; G06F 16/2358; G06F 16/2365; G06F 16/2379
See application file for complete search history.

(56) References Cited

U.S. PATENT DOCUMENTS

| | | | |
|---|---|---|---|
| 6,959,331 B1 | 10/2005 | Traversat et al. | |
| 10,997,160 B1* | 5/2021 | Vig | G06F 16/2379 |
| 2003/0200212 A1 | 10/2003 | Benson et al. | |
| 2010/0145909 A1 | 6/2010 | Ngo | |
| 2011/0035356 A1 | 2/2011 | Vukojevic | |
| 2011/0041006 A1 | 2/2011 | Fowler | |
| 2012/0005154 A1 | 1/2012 | George et al. | |
| 2015/0332283 A1 | 11/2015 | Witchey | |

(Continued)

FOREIGN PATENT DOCUMENTS

WO 2017098519 A1 6/2017

*Primary Examiner* — James E Richardson
(74) *Attorney, Agent, or Firm* — Banner & Witcoff, Ltd.

(57) ABSTRACT

Transaction processing systems in accordance with aspects of the invention may process a variety of transactions. Transaction processing systems may include a transaction processing device and a distributed processing system. The transaction processing device obtains transaction requests from a variety of client devices and process the transaction requests. The distributed processing system may also obtain the transaction requests and maintain a transaction history of the transaction requests obtained and/or processed by the transaction processing device. Both the distributed processing system and the transaction processing device may send a transaction succeeded event based on the transaction being processed successfully. The transaction processing device and distributed ledger may also maintain an indication of if a particular transaction has been processed. When the transaction processing device becomes available after a period of unavailability, the transaction history for both the transaction processing device and distributed ledger may be reconciled.

20 Claims, 5 Drawing Sheets

(56) References Cited

U.S. PATENT DOCUMENTS

| | | |
|---|---|---|
| 2016/0342989 A1 | 11/2016 | Davis |
| 2016/0342994 A1 | 11/2016 | Davis |
| 2017/0132625 A1 | 5/2017 | Kennedy |
| 2017/0132626 A1 | 5/2017 | Kennedy |
| 2017/0148016 A1 | 5/2017 | Davis |
| 2017/0236121 A1 | 8/2017 | Lyons et al. |
| 2017/0243216 A1 | 8/2017 | Kohn |
| 2018/0053161 A1 | 2/2018 | Bordash et al. |
| 2018/0075453 A1 | 3/2018 | Durvasula et al. |
| 2018/0096121 A1 | 4/2018 | Goeringer et al. |
| 2018/0197155 A1 | 7/2018 | Georgen et al. |
| 2018/0197173 A1 | 7/2018 | Durvasula et al. |
| 2018/0253462 A1 | 9/2018 | Dasgupta et al. |
| 2018/0285879 A1 | 10/2018 | Gadnis et al. |

\* cited by examiner

TRANSACTION PROCESSING FAILOVER

CROSS-REFERENCE TO RELATED APPLICATIONS

This application is a continuation of and claims priority to U.S. patent application Ser. No. 16/549,262 filed Aug. 23, 2019, the disclosure of which is hereby incorporated by reference in its entirety.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF USE

Aspects of the disclosure relate generally to transaction processing and more specifically to transaction processing using a distributed ledger failover.

BACKGROUND

Transaction processors typically handle the processing of transaction requests on behalf of one or more entities. One or more of the entities may provide authorization to the transaction processor prior to the transaction processor executing the requested transaction. Once the transaction processor receives an approval (or denial) of a requested transaction, the approval of the transaction may be relayed to the appropriate entities which may then complete the transaction indicated in the transaction request according to the authorization instructions.

Aspects described herein may address these and other problems, and generally improve the quality, efficiency, and speed of transaction processing systems by offering improved system availability by dynamically rerouting authorization services, particularly in distributed processing environments.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below. Corresponding apparatus, systems, and computer-readable media are also within the scope of the disclosure.

Aspects discussed herein relate to techniques for processing transaction requests using distributed processing systems in addition to transaction processing devices. Transaction processing systems in accordance with aspects of the invention may process a variety of transaction requests using both the distributed processing system and the transaction processing device. When the transaction processing device is unavailable, the distributed processing system may process transactions on its own. When the transaction processing device becomes available, the status of the transaction requests arriving during the downtime of the transaction processing device may be synchronized so the transaction processing device does not process transaction requests that have already been processed. This adds resiliency into the transaction processing system to maintain the ability to authorize transactions even in the event of performance issues and/or unavailability of the transaction processing device, thereby improving the capability of existing transaction processing systems to execute transactions in the event of device failure. In several embodiments, the transaction processing system may be even more resilient by utilizing a variety of mobile devices in the distributed processing system, thereby improving the capability of the distributed processing system to remain available and processing transaction requests even during outages affecting one or more geographic regions in which the distributed processing system is operating.

Transaction processing systems in accordance with aspects of the invention may process a variety of transactions. Transaction processing systems may include a transaction processing device and a distributed processing system. The transaction processing device obtains transaction requests from a variety of client devices and process the transaction requests. The distributed processing system may also obtain the transaction requests and maintain a transaction history of the transaction requests obtained and/or processed by the transaction processing device. In several embodiments, the transaction processing device executes the transaction indicated in the transaction request. In a variety of embodiments, the transaction processing device may provide authorization data and/or transaction data generated based on the transaction request to a payment processor. The payment processor may execute the transaction indicated in the transaction request. To overcome failures due to the unavailability of the transaction processing device, the transaction may also be sent to a distributed ledger. The distributed ledger may be maintained by the distributed processing system. Both the distributed processing system and the transaction processing device may send a transaction succeeded event based on the transaction being processed successfully. The transaction may succeed when the transaction processing device's success response is received and/or the distributed processing system's success response is received. In the event that the transaction processing device is unavailable, the transactions may not be written to the transaction processing device but succeeding to be written to the distributed ledger. As the requested transaction succeeds if either the distributed processing system or the transaction processing device provides a response, the customer is able to successfully conduct transactions even during the unavailability of the transaction processing device. The transaction processing device and distributed ledger may also maintain an indication of if a particular transaction has been processed. When the transaction processing device becomes available, the transaction history for both the transaction processing device and distributed ledger may be reconciled such that both systems maintain an accurate record of the processed transactions.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1:
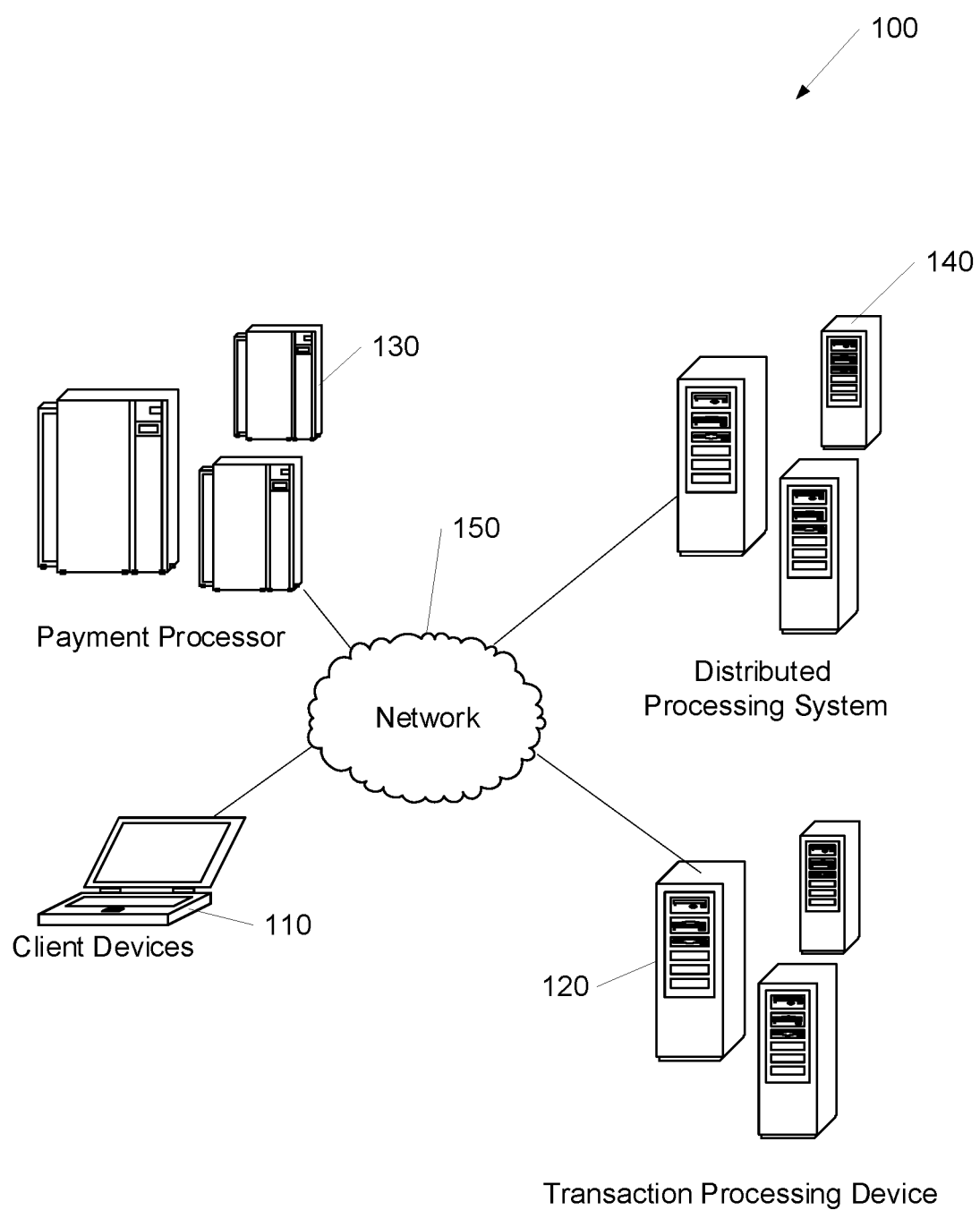
FIG. 1 illustrates an example of a transaction processing system in which one or more aspects described herein may be implemented.

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. In addition, it is to be understood that the phraseology and terminology used herein are for the purpose of description and should not be regarded as limiting. Rather, the phrases and terms used herein are to be given their broadest interpretation and meaning.

By way of introduction, aspects discussed herein relate to techniques for processing transactions using distributed processing systems. Transaction processing systems in accordance with aspects of the invention may process authorizations for a variety of transactions and add resiliency into the transaction processing system to maintain the ability to authorize transactions even in the event of performance issues and/or unavailability of one or more devices within the transaction processing system, such as the transaction processing device or the distributed processing system, thereby improving the capability of existing transaction processing systems to execute transactions in the event of device failure. In a number of embodiments, a transaction processing device can include a variety of network devices, server system, microservices, etc.

Transaction processing systems in accordance with aspects of the invention may process a variety of transactions. Transaction processing systems may include a transaction processing device and a distributed processing system. The transaction processing device obtains transaction requests from a variety of client devices and process the transaction requests. The distributed processing system may also obtain the transaction requests and maintain a transaction history of the transaction requests obtained and/or processed by the transaction processing device. In several embodiments, the transaction processing device executes the transaction indicated in the transaction request. In a variety of embodiments, the transaction processing device may provide authorization data and/or transaction data generated based on the transaction request to a payment processor. The payment processor may execute the transaction indicated in the transaction request.

In several embodiments, a transaction may include a credit card may be used to make a purchase. The transaction request may be recorded by a transaction processing device. The transaction processing device may process the request and send a transaction processed message based on the payment being processed successfully. In a variety of embodiments, a transaction may include a transfer to pay a balance for a account, such as a credit card payment or a loan payment. The transaction processing device may be a system of record for payment history, etc. of the entity providing the account. If the transaction processing device is unavailable, such as in the event of a system outage or network connectivity issues, the requested transaction would fail as the transaction processing device is unavailable to process the transaction. To overcome failures due to the unavailability of the transaction processing device, the transaction may also be sent to a distributed ledger. The distributed ledger may be maintained by a distributed processing system.

The transaction request may be stored using both the distributed ledger as well as the transaction processing device. Both the distributed processing system and the transaction processing device may send a transaction succeeded event based on the transaction being processed successfully. The transaction may succeed when the transaction processing device's success response is received and/or the distributed processing system's success response is received. When the transaction processing device is unavailable, transaction requests transmitted to the transaction processing device may be stored in an error queue for processing once the transaction processing device becomes available. In the event that the transaction processing device is unavailable, the transactions may not be written to the transaction processing device but succeeding to be written to the distributed ledger. As the requested transaction succeeds if either the distributed processing system or the transaction processing device provides a response, the customer is able to successfully conduct transactions even during the unavailability of the transaction processing device. The distributed processing system may process a transaction by determining a consensus that the transaction has been processed by a plurality of the processing nodes of the distributed processing system. In a number of embodiments, the consensus used to process transactions using the distributed processing system may be a proof of stake consensus. The transaction processing device may maintain a greater than 50% stake such that the transaction processing device determines the processing for each transaction when the transaction processing device is available. The transaction processing device and distributed ledger may also maintain an indication of if a particular transaction has been processed. When the transaction processing device becomes available, the transaction history for both the transaction processing device and distributed ledger may be reconciled such that both systems maintain an accurate record of the processed transactions. Reconciling the transaction history also prevents transactions from being double processed when the transaction processing device becomes available.

Once authorized by the transaction processing device and/or distributed processing system, a transaction processing request may be provided to a payment processor for execution. The transaction details along with information regarding the associated account may be used to sign the transaction processing request. The signature may be generated based on a variety of data associated with the transaction, such as name, card number, card expiration date, security code, and/or the transaction details. The signature verifies that a particular card holder has requested the transaction. The signature may be transmitted to and stored by both the transaction processing device and the distributed processing system. Card holder and card number pairings may be stored using the distributed processing system and/or transaction processing device. In several embodiments, the card holder data and the card number data may be decoupled if fraudulent activity is detected such that further transactions requested based on the fraudulent or stolen card will not be executed. Balance information of each account indicated in a transaction may be reconciled on the distributed ledger. The distributed processing system may be used to store the indicated transaction value for each account in escrow and reconciling the transfer of the transaction value between the indicated accounts when the transaction is successfully processed. This allows for the indicated accounts to be up to date both on the distributed ledger and the transaction processing device and allow for the distributed processing system to deny transactions when an indicated account has insufficient value to execute the transaction.

A distributed processing system may be provided by a service provider and may include one or more processing nodes. The processing nodes may be geographically distributed and/or may be grouped into availability zones. Each availability zone may include one or more processing nodes in a particular geographic region. In this way, the distributed processing system may provide a common service in a variety of geographic regions. When one or more processing nodes in a first availability zone (e.g. geographic region) experience a period of unavailability (such as due to network outages, performance issues, and/or underlying hardware failures), requests to the distributed processing system in the first availability zone may be rerouted to processing nodes in a second, geographically distinct, availability zone. In this way, the distributed processing system provides reliable, robust service that is fault-tolerant and resilient against widespread outages in a particular geographic region. Further, distributed processing systems may be provided by a variety of service providers in the same geographic region, overlapping geographic regions, and/or distinct geographic regions. In several embodiments, mobile devices associated with customers may have an application installed that allows the mobile devices to act as processing nodes in the distributed processing system. In a variety of embodiments, the transaction processing device may be a processing node within the distributed processing system. In this way, the distributed ledger maintained by the distributed processing system may be stored using the mobile devices and the transaction processing device. When the transaction processing device is unavailable, the transactions may still be processed as long as at least one mobile device is active in the distributed processing system. This increases the resiliency of the transaction processing system as a whole and allows for transactions to be processed even in catastrophic failure scenarios.

FIG. 1 illustrates a transaction processing system 100 in accordance with an embodiment of the invention. The transaction processing system 100 includes at least one client device 110, at least one transaction processing device 120, at least one distributed processing system 140, and/or at least one payment processor 130 in communication via a network 150. It will be appreciated that the network connections shown are illustrative and any means of establishing a communications link between the computers may be used. The existence of any of various network protocols such as TCP/IP, Ethernet, FTP, HTTP and the like, and of various wireless communication technologies such as GSM, CDMA, WiFi, and LTE, is presumed, and the various computing devices described herein may be configured to communicate using any of these network protocols or technologies. Any of the devices and systems described herein may be implemented, in whole or in part, using one or more computing devices described with respect to FIG. 2.

Client devices 110 may provide transaction requests to the at least one transaction processing device 120 and/or distributed processing system 140 as described herein. Transaction processing devices 120 and/or distributed processing systems 140 may be configured for processing transactions as described herein. Payment processors 130 may execute processed transactions as described herein. The network 150 may include a local area network (LAN), a wide area network (WAN), a wireless telecommunications network, and/or any other communication network or combination thereof.

Some or all of the data described herein may be stored using any of a variety of data storage mechanisms, such as databases. These databases may include, but are not limited to relational databases, hierarchical databases, distributed databases, in-memory databases, flat file databases, XML databases, NoSQL databases, graph databases, and/or a combination thereof. The data transferred to and from various computing devices in the transaction processing system 100 may include secure and sensitive data, such as confidential documents, customer personally identifiable information, and account data. It may be desirable to protect transmissions of such data using secure network protocols and encryption and/or to protect the integrity of the data when stored on the various computing devices. For example, a file-based integration scheme or a service-based integration scheme may be utilized for transmitting data between the various computing devices. Data may be transmitted using various network communication protocols. Secure data transmission protocols and/or encryption may be used in file transfers to protect the integrity of the data, for example, File Transfer Protocol (FTP), Secure File Transfer Protocol (SFTP), and/or Pretty Good Privacy (PGP) encryption. In many embodiments, one or more web services may be implemented within the various computing devices. Web services may be accessed by authorized external devices and users to support input, extraction, and manipulation of data between the various computing devices in the transaction processing system 100. Web services built to support a personalized display system may be cross-domain and/or cross-platform, and may be built for enterprise use. Data may be transmitted using the Secure Sockets Layer (SSL) or Transport Layer Security (TLS) protocol to provide secure connections between the computing devices. Web services may be implemented using the WS-Security standard, providing for secure SOAP messages using XML encryption. Specialized hardware may be used to provide secure web services. For example, secure network appliances may include built-in features such as hardware-accelerated SSL and HTTPS, WS-Security, and/or firewalls. Such specialized hardware may be installed and configured in the transaction processing system 100 in front of one or more computing devices such that any external devices may communicate directly with the specialized hardware.

Figure 2:
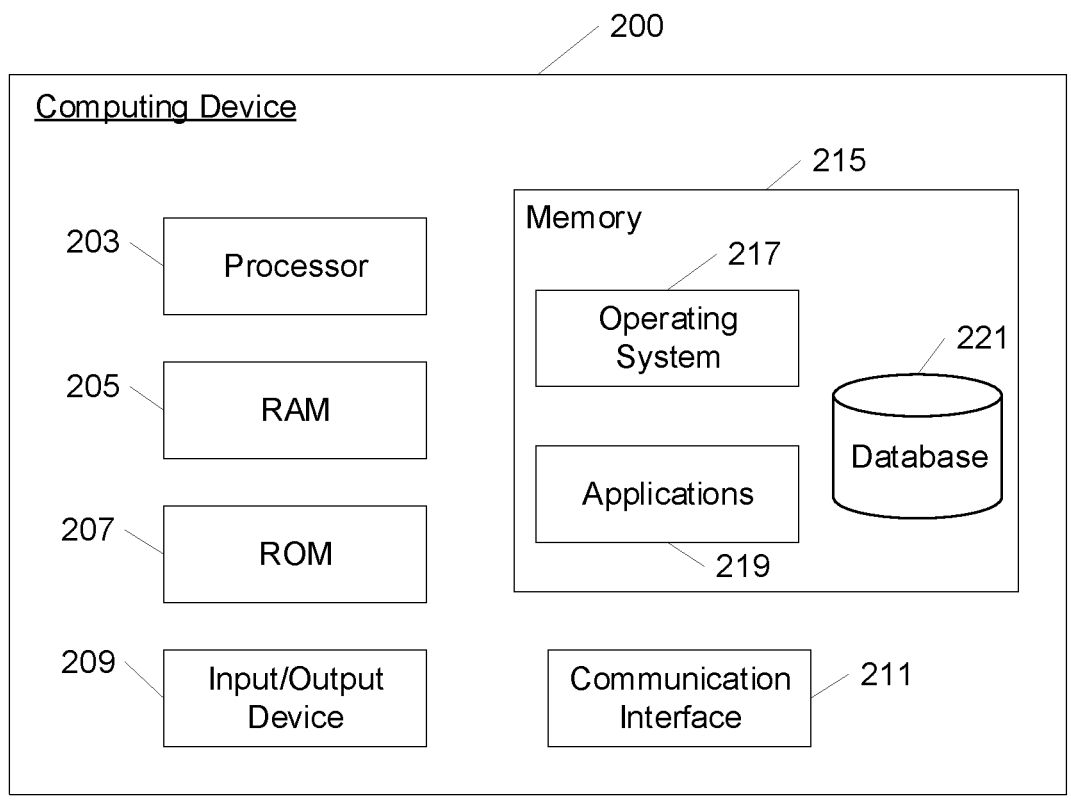
FIG. 2 illustrates an example computing device in accordance with one or more aspects described herein.

Turning now to FIG. 2, a computing device 200 in accordance with an embodiment of the invention is shown. The computing device 200 may include a processor 203 for controlling overall operation of the computing device 200 and its associated components, including RAM 205, ROM 207, input/output device 209, communication interface 211, and/or memory 215. A data bus may interconnect processor(s) 203, RAM 205, ROM 207, memory 215, I/O device 209, and/or communication interface 211. In some embodiments, computing device 200 may represent, be incorporated in, and/or include various devices such as a desktop computer, a computer server, a mobile device, such as a laptop computer, a tablet computer, a smart phone, any other types of mobile computing devices, and the like, and/or any other type of data processing device.

Input/output (I/O) device 209 may include a microphone, keypad, touch screen, and/or stylus through which a user of the computing device 200 may provide input, and may also include one or more of a speaker for providing audio output and a video display device for providing textual, audiovisual, and/or graphical output. Communication interface 211 may include one or more transceivers, digital signal processors, and/or additional circuitry and software for communicating via any network, wired or wireless, using any protocol as described herein. Software may be stored within memory 215 to provide instructions to processor 203 allowing computing device 200 to perform various actions. For example, memory 215 may store software used by the computing device 200, such as an operating system 217, application programs 219, and/or an associated internal database 221. The various hardware memory units in memory 215 may include volatile and nonvolatile, removable and non-removable media implemented in any method or technology for storage of information such as computer-readable instructions, data structures, program modules, or other data. Memory 215 may include one or more physical persistent memory devices and/or one or more non-persistent memory devices. Memory 215 may include, but is not limited to, random access memory (RAM) 205, read only memory (ROM) 207, electronically erasable programmable read only memory (EEPROM), flash memory or other memory technology, optical disk storage, magnetic cassettes, magnetic tape, magnetic disk storage or other magnetic storage devices, or any other medium that may be used to store the desired information and that may be accessed by processor 203.

Processor 203 may include a single central processing unit (CPU), which may be a single-core or multi-core processor, or may include multiple CPUs. Processor(s) 203 and associated components may allow the computing device 200 to execute a series of computer-readable instructions to perform some or all of the processes described herein. Although not shown in FIG. 2, various elements within memory 215 or other components in computing device 200, may include one or more caches, for example, CPU caches used by the processor 203, page caches used by the operating system 217, disk caches of a hard drive, and/or database caches used to cache content from database 221. For embodiments including a CPU cache, the CPU cache may be used by one or more processors 203 to reduce memory latency and access time. A processor 203 may retrieve data from or write data to the CPU cache rather than reading/writing to memory 215, which may improve the speed of these operations. In some examples, a database cache may be created in which certain data from a database 221 is cached in a separate smaller database in a memory separate from the database, such as in RAM 205 or on a separate computing device. For instance, in a multi-tiered application, a database cache on an application server may reduce data retrieval and data manipulation time by not needing to communicate over a network with a back-end database server. These types of caches and others may be included in various embodiments, and may provide potential advantages in certain implementations of devices, systems, and methods described herein, such as faster response times and less dependence on network conditions when transmitting and receiving data.

Although various components of computing device 200 are described separately, functionality of the various components may be combined and/or performed by a single component and/or multiple computing devices in communication without departing from the invention.

Figure 3:
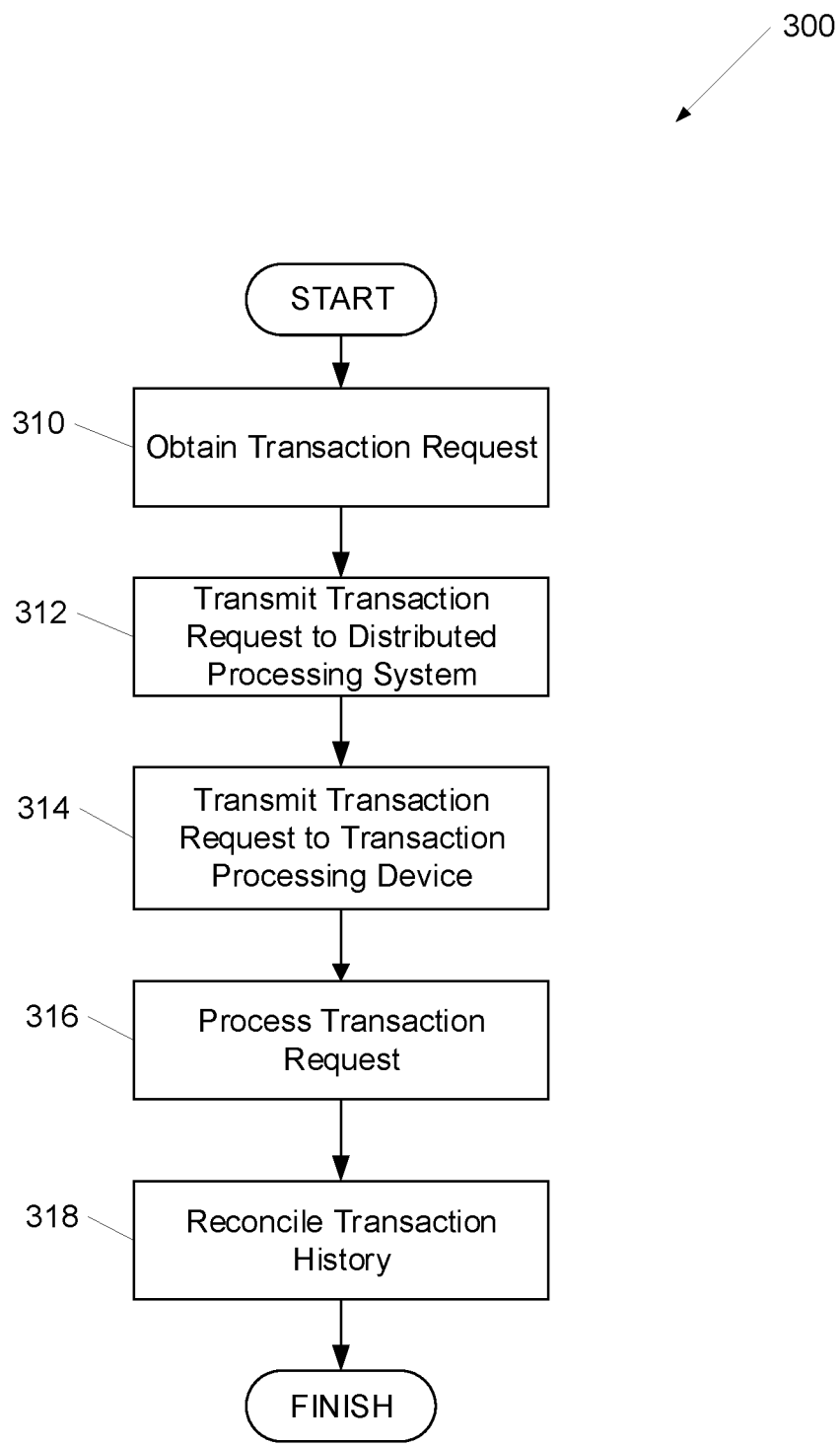
FIG. 3 depicts a flow chart for processing a transaction according to one or more aspects of the disclosure.

FIG. 3 depicts a flow chart for processing a transaction according to one or more aspects of the disclosure. Some or all of the steps of process 300 may be performed using any of the computing devices and/or combination thereof described herein. In a variety of embodiments, some or all of the steps described below may be combined and/or divided into sub-steps as appropriate.

At step 310, a transaction request may be obtained. In many embodiments, a transaction request is generated by a client device requesting the transaction be executed. The transaction request may include a transaction identifier, a transaction value, a source entity from which the transaction value is to be provided, a destination entity to which the transaction value is to be sent, a date and/or a time at which the transaction request was generated and/or received, an identifier of the party requesting the transaction, an indication of the maximum processing time associated with the authorization request, an indication of a transaction processing system associated with the source entity and/or destination entity, and/or any other appropriate information. In several embodiments, a transaction request may cause a payment processor to execute the transaction indicated in the transaction request.

The transaction request may be obtained by a distributed processing system, a transaction processing device, and/or any other computing device configured to obtain transaction requests. In a variety of embodiments, a computing device includes a transaction router or transaction gateway that receives transaction requests and routes the transaction requests to the transaction processing device and/or distributed processing system. In a variety of embodiments, the transaction router or transaction gateway includes a distributed data streaming platform capable of obtaining a variety of data, transmitting the data to various computing devices, maintaining an error queue of undelivered data when a particular computing device is unavailable, and transmitting data stored in the error queue when the particular computing device becomes available. The computing device obtaining the transaction request may associate a transaction status indicator, such as a transaction processed flag, that indicates if a particular transaction request has been processed, with the obtained transaction request. In many embodiments, the transaction status indicator defaults to an indication that the transaction request is unprocessed.

At step 312, the transaction request may be transmitted to a distributed processing system. In several embodiments, the transaction data is transmitted by a transaction router or transaction gateway. The distributed processing system may include a variety of processing nodes. Processing nodes may include geographically distributed processing nodes in communication with each other to provide a distributed processing system for storing and processing data. A distributed processing system may also provide a variety of management devices and/or shared memory pools, such as an in-memory data grid, that are accessible by one or more of the processing nodes. The management devices may be used to control the performance of the processing nodes, including creating processing nodes, modifying the operation and/or resource allocation of processing nodes, and/or destroying processing nodes. Shared memory pools may be used to store data accessible by one or more processing nodes executing within the distributed processing system. The transaction request may be stored using a distributed ledger maintained by the distributed processing system. In a variety of embodiments, the transaction request is encrypted and the encrypted transaction request is stored using the distributed ledger. A variety of techniques for encrypting transaction requests and/or account information that may be used are described in more detail with respect to FIG. 5.

At step 314, the transaction data may be transmitted to a transaction processing device. In several embodiments, the transaction processing devices obtain the transaction data using a distributed data streaming platform, such as Apache Kafka provided by the Apache Software Foundation of Forest Hill, Md. In several embodiments, the transaction data is transmitted by a transaction router or transaction gateway. The transaction processing device may be associated with the source entity and/or destination entity identified in the transaction request. In several embodiments, the source entity and/or destination entity indicates card holder information and/or card number information. The transaction processing device may be associated with an entity identified by the card holder information and/or card number information. The transaction processing device may store its own copy of the transaction request and/or may have access to the distributed ledger maintained by the distributed processing system. In several embodiments, the transaction processing device stores the transaction request in a transaction database maintained by the transaction processing device. In many embodiments, the transaction processing device accesses the distributed ledger using an application programming interface, such as a web service, provided by the distributed processing system. In a number of embodiments, the transaction processing device is a processing node of the distributed processing system and may be provided with a copy of the distributed ledger via the distributed processing system.

At step 316, the transaction request may be processed. The transaction request may be processed by the distributed processing system and/or the transaction processing device. In a variety of embodiments, the first of the distributed processing system and the transaction processing device to process the transaction request determines the outcome of the transaction request. A transaction request may be approved or denied. In a variety of embodiments, a transaction request may be approved unless one or more exceptions are indicated in the transaction request. If an exception is indicated in the transaction request, the transaction may be denied. Exceptions may include, but are not limited to, fraud indicators with respect to the source entity and/or the destination entity, insufficient transaction value in the source entity, invalid time stamps, duplicate transaction identifiers, invalid transaction values, and the like. In many embodiments, the transaction request is processed by determining if the transaction request is to be approved or denied and providing the result to a payment processor for execution. The distributed processing system may process a transaction by determining a consensus that the transaction has been processed by a plurality of the processing nodes of the distributed processing system. In a number of embodiments, the consensus used to process transactions using the distributed processing system may be a proof of stake consensus. The transaction processing device may maintain a greater than 50% stake such that the transaction processing device determines the result for the transaction request when the transaction processing device is available and the remaining processing nodes determines the result for the transaction request when the transaction processor is unavailable.

At step 318, a transaction history may be reconciled. The transaction history may be stored using the transaction processing device and/or a distributed ledger maintained by the distributed processing system. The transaction history may include a set of transaction requests along with a status indicator for each transaction request. The status indicator may indicate the outcome of the transaction request, an identifier of the system (e.g. the transaction processor and/or the distributed processing system) that processed the transaction request, and/or any other data as appropriate. A variety of processes for reconciling a transaction history are described in more detail with respect to FIG. 4.

Figure 4:
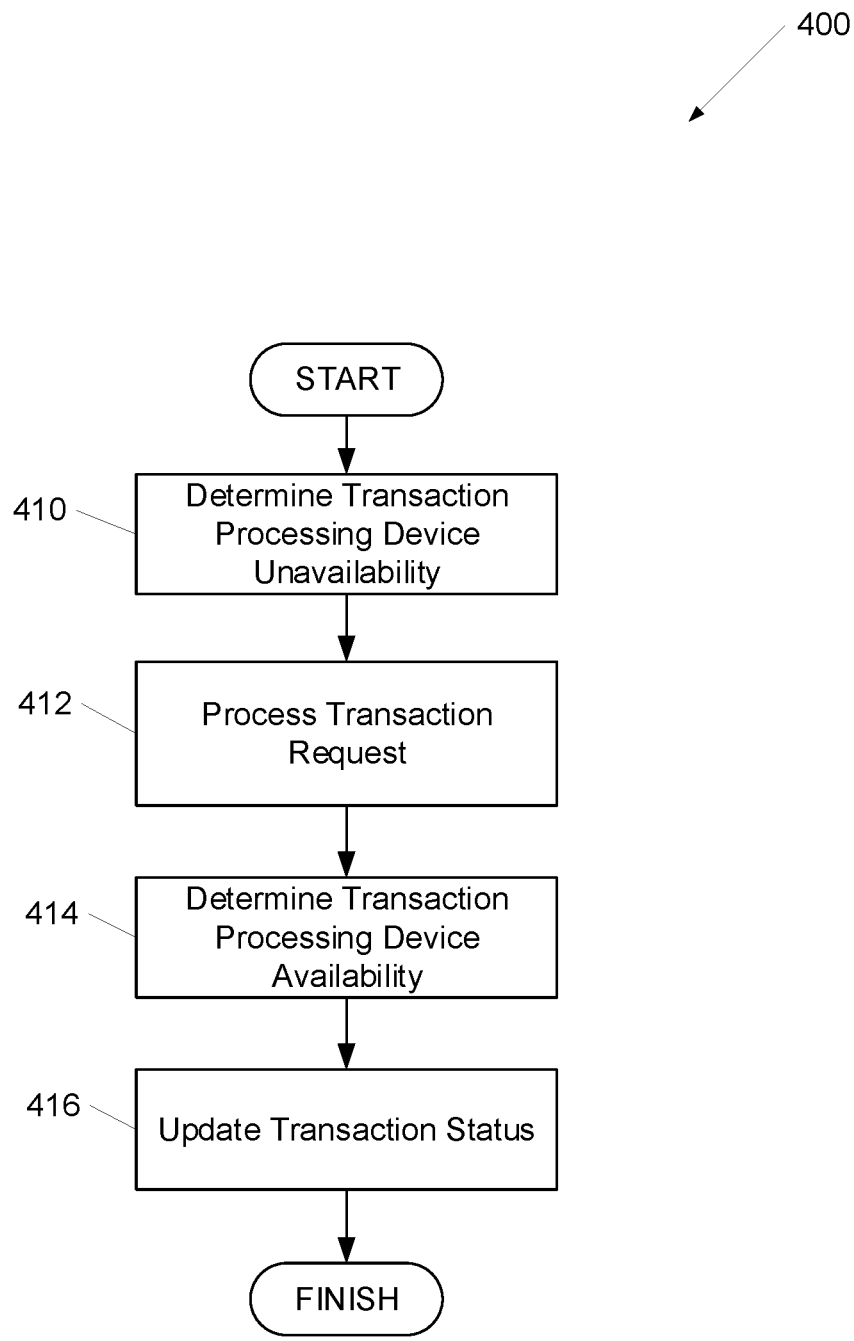
FIG. 4 depicts a flow chart for reconciling a transaction history according to one or more aspects of the disclosure.

FIG. 4 depicts a flow chart for reconciling a transaction history according to one or more aspects of the disclosure. Some or all of the steps of process 400 may be performed using any of the computing devices and/or combination thereof described herein. In a variety of embodiments, some or all of the steps described below may be combined and/or divided into sub-steps as appropriate.

At step 410, a transaction processing device may be determined to be unavailable. The transaction processing device may be determined by any of a variety of computing devices, such as a transaction router, transaction gateway, and/or distributed processing system. A transaction processing device may be unavailable for a variety of reasons, including a system outage or network connectivity issues. For example, a transaction processing device may experience a hardware failure that causes the transaction processing device to stop functioning. In a second example, the network connection used by the transaction processing device may fail due to a service provider issue and the transaction processing device is unable to transmit data via the network connection. In several embodiments, a transaction processing device may be determined to be unavailable when the transaction processing device fails to process a transaction request within a threshold time period. The threshold time period may be pre-determined and/or determined dynamically, such as via a service level agreement. When the transaction processing device is unavailable, transaction requests transmitted to the transaction processing device may be stored in an error queue for processing once the transaction processing device becomes available. The error queue may be maintained by the transaction processing device, a computing platform hosting the transaction processing device, and/or a computing device remote from the transaction processing device, such as a transaction router or transaction gateway, as appropriate. In several embodiments, the error queue is an Apache Kafka error queue.

At step 412, a transaction request may be processed. The transaction request may be processed using a distributed processing system. The transaction request may be processed to determine if the transaction request should be approved or denied as described herein. Processing the transaction request may include updating a transaction status flag associated with the transaction request to indicate that the request has been processed by the distributed processing system and/or an indication of the outcome of the transaction request processing. The transaction request and/or transaction status flag may be stored using a distributed ledger maintained by the distributed processing system.

At step 414, the transaction processing device may be determined to be available. The transaction processing device may be available when the transaction processing device is capable of receiving transaction requests, processing the transaction requests, and transmitting transaction processed messages. The transaction processing device may be determined to be available when the conditions causing the transaction processing device to be unavailable have been corrected. In several embodiments, the transaction processing device is determined to be available when the transaction processing device processes a transaction request within a time period indicated in a service level agreement. Transaction requests that have been transmitted to the transaction processing device and queued in an error queue while the transaction processing device was unavailable may be transmitted from the error queue to a transaction database maintained by the transaction processing device. The transaction database may store the transaction requests along with a transaction status flag associated with each transaction request.

At step 416, one or more transaction statuses may be updated. The transaction status data maintained by the transaction processing device may be obtained to match the transaction status data maintained by the distributed processing system. In many embodiments, each transaction request and corresponding transaction status data are time-stamped. A set of transaction requests and/or transaction status data may be determined based on the time at which the transaction processing device became unavailable and/or the time at which the transaction processing device became available. This set of transaction data may be used to update the status of each transaction request transmitted to the transaction processing device during the time in which the transaction processing device was unavailable. In several embodiments, each transaction request is associated with a unique identifier. The transaction processing device may request the transaction status data for each transaction request indicated in the error queue from the distributed processing system. In this way, the transaction status device may update the status of each transaction request such that the transaction processing device and distributed processing system properly reflect the status of each transaction request.

Figure 5:
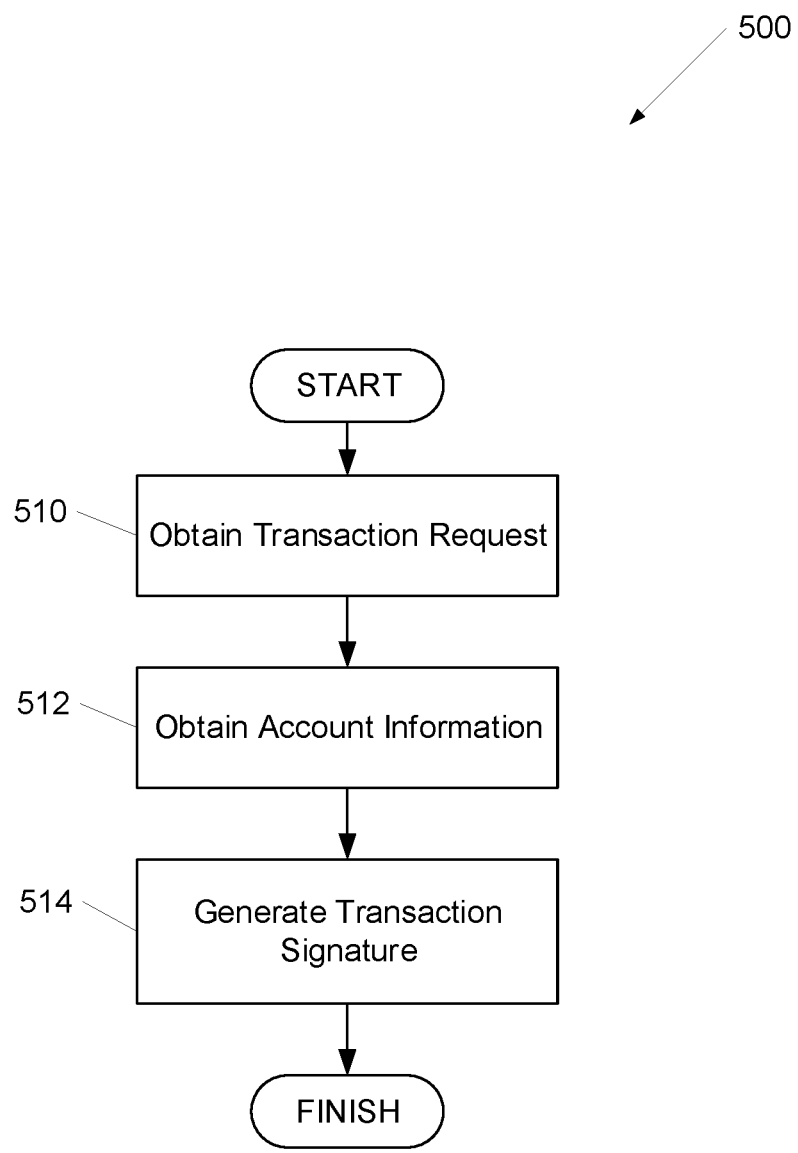
FIG. 5 depicts a flow chart for generating a transaction signature according to one or more aspects of the disclosure.

FIG. 5 depicts a flow chart for generating a transaction signature according to one or more aspects of the disclosure. Some or all of the steps of process 500 may be performed using any of the computing devices and/or combination thereof described herein. In a variety of embodiments, some or all of the steps described below may be combined and/or divided into sub-steps as appropriate.

At step 510, a transaction request may be obtained. In many embodiments, a transaction request is generated by a client device requesting the transaction be executed. The transaction request may include a transaction identifier, a transaction value, a source entity from which the transaction value is to be provided, a destination entity to which the transaction value is to be sent, a date and/or a time at which the transaction request was generated and/or received, an identifier of the party requesting the transaction, an indication of the maximum processing time associated with the authorization request, and/or any other appropriate information. In several embodiments, a transaction request may cause a payment processor to execute the transaction indicated in the transaction request.

At step 512, account information may be obtained. The account information may be obtained for the source entity and/or the destination entity indicated in the transaction request. The account information may be obtained via the transaction request and/or may be obtained from the source entity and/or destination entity indicated in the transaction request. In a variety of embodiments, the account information is obtained by the transaction processing device and/or distributed processing system during the processing of the transaction request. For example, the account information may include an account number obtained from a computing device associated with the source entity. The computing device may provide the account information along with a confirmation that the associated account has sufficient value to execute the transaction request.

At step 514, a transaction signature may be generated. The transaction details along with information regarding the associated account may be used to generate the transaction signature. The signature may be generated based on a variety of data associated with the transaction, such as name, account number, account expiration date, security code, and/or the transaction details indicated in the transaction request. The transaction signature may verify that a particular account has requested the transaction. The transaction signature may encrypt the transaction request and/or account information such that third parties are unable to process the encrypted transaction request and/or account information. The transaction signature may be transmitted to and stored by both the transaction processing device and the distributed processing system. In a variety of embodiments, each processing node in the set of processing nodes and/or the transaction processing device have an encryption key that is unique to each processing node and/or transaction processing device. Any of a variety of encryption keys, such as public-private key pairs, may be used as appropriate. The processing nodes and/or transaction processing device may generate the transaction signature by encrypting the transaction request and/or account information using the encryption key. In several embodiments, the transaction signature is a ring signature indicating that the transaction signature was generated by the transaction processing device and/or distributed processing system without indicating which processing node and/or transaction processing device generated the transaction signature. The ring signature may be generated based on any of a variety of digital cryptosystems, such as RSA cryptosystems and Rabin cryptosystems, as appropriate.

It should be noted that, while many embodiments described herein include the transaction processing device being unavailable and the distributed processing system being available and processing requests, a variety of embodiments include the transaction processing device being available and the distributed processing system being available. In this way, transaction requests may be queued up for the distributed processing system during periods of unavailability of the distributed processing system, and the status of each of those transaction requests may be provided by the transaction processing device to the distributed processing system once the distributed processing system becomes available as described herein.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, and the like. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid-state memory, RAM, and the like. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a system, and/or a computer program product.

Although the present invention has been described in certain specific aspects, many additional modifications and variations would be apparent to those skilled in the art. In particular, any of the various processes described above may be performed in alternative sequences and/or in parallel (on different computing devices) in order to achieve similar results in a manner that is more appropriate to the requirements of a specific application. It is therefore to be understood that the present invention may be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A computing device, comprising:
one or more processors; and
memory storing instructions that, when executed by the one or more processors, cause the computing device to:
obtain a transaction request;
generate, based on the transaction request, transaction status data for the transaction request indicating that the transaction request is unprocessed by a transaction processing device;
transmit the transaction request to a distributed processing system, wherein the distributed processing system comprises a set of processing nodes, and wherein at least one node in the set of processing nodes is configured to:
process the transaction request to generate a response and distributed transaction status data indicating that the transaction request has been processed by determining a consensus that the transaction request has been processed by a plurality of processing nodes of the set of processing nodes;
transmit the generated response; and
store the transaction request and the distributed transaction status data in a distributed ledger based on the consensus;
based on a determination that the transaction processing device is unavailable at a first time, store a set of unprocessed transaction requests in an error queue;
query, at a second time and based on a determination that the transaction processing device is unavailable, the transaction processing device to determine that the transaction processing device is available at a second time;
obtain, from the distributed processing system and based on a determination that the transaction processing device is available, updated transaction status data for the set of unprocessed transaction requests stored in the error queue; and
update the transaction status data for each of the unprocessed transaction requests based on the updated transaction status data obtained from the distributed processing system.

2. The computing device of claim 1, wherein the instructions, when executed by the one or more processors, further cause the computing device to:
obtain, from the distributed processing system, transaction status data indicating that an unprocessed transaction request of the unprocessed transaction requests has been processed; and
update the transaction status data for each transaction corresponding to the unprocessed transaction requests to indicate that each of the transactions has been processed according to the obtained transaction status data.

3. The computing device of claim 1, wherein the distributed processing system stores the distributed ledger using the set of processing nodes.

4. The computing device of claim 1, wherein:
the distributed processing system is provided by a first service provider; and
the transaction processing device is provided by a second service provider distinct from the first service provider.

5. The computing device of claim 1, wherein:
the distributed processing system is provided in a first availability zone provided by a service provider; and
the transaction processing device is provided in a second availability zone provided by the service provider, the second availability zone geographically distinct from the first availability zone.

6. The computing device of claim 1, wherein the computing device is a processing node in the set of processing nodes.

7. The computing device of claim 6, wherein:
the distributed processing system processes the transaction request using a proof of stake consensus;
each node in the set of processing nodes comprises a stake share such that a sum of the stake share for each node in the set of processing nodes constitutes a total stake of the distributed processing system; and
the stake share of the computing device comprises a majority of the total stake of the distributed processing system.

8. The computing device of claim 1, wherein at least one node in the distributed processing system comprises at least one mobile device associated with an account indicated in the transaction status data.

9. The computing device of claim 1, wherein at least one node of the distributed processing system comprises at least one service provider device associated with a service provider providing an account indicated in the transaction status data.

10. The computing device of claim 9, wherein the at least one service provider device is geographically distributed such that a failure of a first service provider device in a first geographic region does not affect a second service provider device in a second geographic region.

11. A method, comprising:
obtaining, by a transaction gateway, a transaction request;
transmitting, by the transaction gateway and to a distributed processing system, the transaction request, wherein the transaction request causes the distributed processing system to store the transaction request in a distributed ledger by determining a consensus that the transaction request has been processed by a plurality of processing nodes of a set of processing nodes, wherein the transaction request is indicated as unprocessed; and
based on determining, by the transaction gateway, that a transaction processing device is unavailable at a first time, storing, by the transaction gateway, a set of unprocessed transaction data using an error queue;
querying, at a second time and based on a determination that the transaction processing device is unavailable, the transaction processing device to determine when the transaction processing device becomes available;

transmitting, by the transaction gateway to the transaction processing device and based on a determination that the transaction processing device is available, the unprocessed transaction data stored using the error queue, wherein the unprocessed transaction data comprises a set of transaction requests that are indicated as unprocessed;

transmitting, by the transaction processing device to the distributed processing system, the unprocessed transaction data;

obtaining, by the transaction processing device and from the distributed processing system, transaction status data indicating that the unprocessed transaction data has been processed by the distributed processing system while the transaction processing device was unavailable; and updating, by the transaction processing device, each transaction request in the set of unprocessed transaction data to indicate that each transaction has been processed as indicated in the transaction status data corresponding to each transaction request.

12. The method of claim 11, wherein the distributed processing system stores the distributed ledger using a set of processing nodes.

13. The method of claim 11, wherein:
the distributed processing system is provided by a first service provider; and
the transaction processing device is provided by a second service provider distinct from the first service provider.

14. The method of claim 11, wherein:
the distributed processing system comprises a set of processing nodes processing the unprocessed transaction data using a proof of stake consensus; and
each node in the set of processing nodes comprises a stake share such that a sum of the stake share for each node in the set of processing nodes constitutes a total stake of the distributed processing system.

15. The method of claim 14, wherein:
the set of processing nodes comprises the transaction processing device; and
the stake share for the transaction processing device comprises a majority of the total stake of the distributed processing system.

16. The method of claim 11, wherein the distributed processing system comprises at least one mobile device associated with an account indicated in the unprocessed transaction data.

17. A non-transitory machine-readable medium storing instructions that, when executed by one or more processors, cause the one or more processors to perform steps comprising:
obtaining a transaction request;
generating, based on the transaction request, transaction status data for the transaction request indicating that the transaction request is unprocessed by a transaction processing device;
transmitting the transaction request to a distributed processing system, wherein the distributed processing system comprises a set of processing nodes, and wherein at least one node in the set of processing nodes is configured to:
process the transaction request to generate a response and distributed transaction status data indicating that the transaction request has been processed by determining a consensus that the transaction request has been processed by a plurality of processing nodes of the set of processing nodes;
transmit the generated response, and
store the transaction request and the distributed transaction status data in a distributed ledger based on the consensus;
based on determining that the transaction processing device is unavailable at a first time, storing a set of unprocessed transaction requests in an error queue;
querying, at a second time and based on a determination that the transaction processing device is unavailable, the transaction processing device to determine that the transaction processing device is available;
obtaining, from the distributed processing system, updated transaction status data for the set of unprocessed transaction requests stored in the error queue; and
updating the transaction status data for each of the unprocessed transaction requests based on the updated transaction status data obtained from the distributed processing system.

18. The non-transitory machine-readable medium of claim 17, wherein:
the distributed processing system comprises a set of processing nodes;
the distributed processing system processes the distributed transaction status data using a proof of stake consensus; and
each node in the set of processing nodes comprises a stake share such that a sum of the stake share for each node in the set of processing nodes constitutes a total stake of the distributed processing system.

19. The non-transitory machine-readable medium of claim 17, wherein:
the distributed processing system is provided by a first service provider; and
the transaction processing device is provided by a second service provider distinct from the first service provider.

20. The non-transitory machine-readable medium of claim 17, wherein:
the distributed processing system is provided in a first availability zone provided by a service provider; and
the transaction processing device is provided in a second availability zone provided by the service provider, the second availability zone geographically distinct from the first availability zone.

* * * * *